(12) United States Patent
Hebgen et al.

(10) Patent No.: US 11,681,098 B2
(45) Date of Patent: Jun. 20, 2023

(54) LOW MOAT VOLUME SINGLE MODE ULTRA-LOW LOSS FIBER

(71) Applicant: CORNING INCORPORATED, Corning, NY (US)

(72) Inventors: Peter Gottfried Hebgen, Wilmington, NC (US); Hazel Benton Matthews, III, Wilmington, NC (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/547,672

(22) Filed: Dec. 10, 2021

(65) Prior Publication Data
US 2022/0187531 A1 Jun. 16, 2022

Related U.S. Application Data

(60) Provisional application No. 63/124,455, filed on Dec. 11, 2020.

(51) Int. Cl.
*G02B 6/02* (2006.01)
*G02B 6/028* (2006.01)
*G02B 6/036* (2006.01)

(52) U.S. Cl.
CPC ....... *G02B 6/0281* (2013.01); *G02B 6/02009* (2013.01); *G02B 6/0286* (2013.01); *G02B 6/02214* (2013.01); *G02B 6/03622* (2013.01); *G02B 6/02028* (2013.01); *G02B 6/03633* (2013.01)

(58) Field of Classification Search
CPC .......... G02B 6/02009; G02B 6/02028; G02B 6/02214; G02B 6/0281; G02B 6/0286; G02B 6/03622; G02B 6/03633
See application file for complete search history.

(56) References Cited

U.S. PATENT DOCUMENTS

| | | | |
|---|---|---|---|
| 7,088,900 B1 | 8/2006 | Mishra | |
| 7,689,085 B1 | 3/2010 | Mishra | |
| 7,844,155 B2 | 11/2010 | Bickham et al. | |
| 7,929,818 B1 * | 4/2011 | Bickham | G02B 6/0286 385/124 |

(Continued)

OTHER PUBLICATIONS

International Search Report and Written Opinion of the International Searching Authority; PCT/US2021/062312; dated Mar. 28, 2022, 17 pages; European Patent Office.

(Continued)

*Primary Examiner* — Ryan A Lepisto
(74) *Attorney, Agent, or Firm* — Kevin L. Bray (57) ABSTRACT

Embodiments of the current disclosure include low moat volume single mode ultra-low loss optical fibers. In some embodiments, a single mode optical fiber includes a first core region; a second core region surrounding and directly adjacent to the first core region, wherein a volume V of the second core region is less than or equal to 14% $\Delta\mu m^2$; a cladding region surrounding the core region; and wherein the optical fiber has a cable cutoff of less than 1260 nm, a mode field diameter at 1310 nm of 8.6 microns to 9.7 microns, a mode field diameter at 1550 nm of 9.9 microns to 11 microns, and an attenuation at 1550 nm of less than or equal to 0.17 dB/km.

20 Claims, 2 Drawing Sheets

(56) References Cited

U.S. PATENT DOCUMENTS

| | | | |
|---|---|---|---|
| 8,315,495 B2* | 11/2012 | Bickham | G02B 6/02019 |
| | | | 385/127 |
| 9,874,686 B2* | 1/2018 | Mishra | G02B 6/02019 |
| 2014/0241684 A1 | 8/2014 | Bookbinder et al. | |
| 2014/0294355 A1 | 10/2014 | Bickham et al. | |
| 2016/0131832 A1* | 5/2016 | Haruna | G02B 6/0283 |
| | | | 385/127 |
| 2017/0017032 A1* | 1/2017 | Mishra | G02B 6/03655 |
| 2018/0031762 A1* | 2/2018 | Bookbinder | G02B 6/02276 |

OTHER PUBLICATIONS

Jeunhomme, "Single-Mode Fiber Optics", 1990, pp. 39-44.

\* cited by examiner

LOW MOAT VOLUME SINGLE MODE ULTRA-LOW LOSS FIBER

CROSS-REFERENCE TO RELATED APPLICATIONS

This application claims the benefit of priority under 35 U.S.C. § 119 of U.S. Provisional Application Ser. No. 63/124,455 filed on Dec. 11, 2020, the content of which is relied upon and incorporated herein by reference in its entirety.

FIELD OF THE DISCLOSURE

This disclosure pertains to optical fibers. More particularly, this disclosure pertains to single-mode optical fibers. Most particularly, this disclosure pertains to low moat volume single mode ultra-low loss optical fiber.

BACKGROUND OF THE DISCLOSURE

Telecommunication systems, both submarine and terrestrial applications, require fiber which is capable of transmitting signals for a long distance without degradation. The fiber attributes such as attenuation and bend loss contribute to the degradation of the signal. Current submarine and terrestrial applications require improved bend performance of optical fibers in large bend diameter (e.g. 50-70 mm range) while maintaining other optical attributes suitable for such applications (e.g. mode field diameter, cable cutoff and attenuation).

Improvements in the foregoing are desired. Accordingly, the inventors have developed single mode optical fibers having low bend loss at large bend diameters.

SUMMARY

A first embodiment of the present disclosure includes single mode optical fiber, comprising: a first core region having an α value $1.5 \leq \alpha \leq 10$, and extending to an outer radius $r_1$, wherein 2.5 µm$\leq r_1 \leq$8 µm, and having a relative refractive index percent profile, $\Delta_1(r)$ in % measured relative to pure silica, a minimum relative refractive index $\Delta_{1MIN}$, a maximum relative refractive index $\Delta_{1MAX}$ and the relative refractive index measured at a radius r=2 µm, wherein $-0.35 \leq \Delta_{1MIN} \leq -0.05$; a second core region surrounding and directly adjacent to the first core region and extending to a radius 10 µm$\leq r_2 \leq$22 µm and having a negative relative refractive index percent profile, $\Delta_2(r)$ in %, measured relative to pure silica, with a minimum relative refractive index percent $\Delta_{2MIN}$, wherein $-0.47\% \leq \Delta_{2MIN} \leq -0.3\%$ and wherein a volume V of the second core region is less than or equal to 14% $\Delta$µm$^2$; a cladding region surrounding the core and comprising: a relative refractive index percent $\Delta_3(r)$ in % measured relative to pure silica and a minimum refractive index delta $\Delta_{3MIN}$, and $-0.45\% \leq \Delta_3 \leq -0.2\%$; and wherein the optical fiber has a cable cutoff of less than 1260 nm, a mode field diameter at 1310 nm of 8.6 microns to 9.7 microns, a mode field diameter at 1550 nm of 9.9 microns to 11 microns, and an attenuation at 1550 nm of less than or equal to 0.17 dB/km.

A second embodiment of the present disclosure may include the first embodiment wherein the volume V of the second annular core region is 0% $\Delta$µm$^2$ to 9% $\Delta$µm$^2$.

A third embodiment of the present disclosure may include the first embodiment, wherein the volume V of the second annular core region is 4% $\Delta$µm$^2$ to 9% $\Delta$µm$^2$.

A fourth embodiment of the present disclosure may include the first embodiment, wherein the volume V of the second annular core region is 2% $\Delta$µm$^2$ to 7% $\Delta$µm$^2$.

A fifth embodiment of the present disclosure may include the fourth embodiment, wherein the volume V of the second annular core region is 2% $\Delta$µm$^2$ to 9% $\Delta$µm$^2$.

A sixth embodiment of the present disclosure may include the first embodiment, wherein the optical fiber exhibits a macrobend loss of less than 0.75 dB/turn when wound upon on a 30 mm diameter mandrel.

A seventh embodiment of the present disclosure may include the first embodiment, wherein the optical fiber exhibits a macrobend loss of less than 0.5 dB/turn when wound upon on a 40 mm diameter mandrel.

A eighth embodiment of the present disclosure may include the first embodiment, wherein the optical fiber exhibits a macrobend loss of less than 0.05 dB/turn when wound upon on a 50 mm diameter mandrel.

A ninth embodiment of the present disclosure may include the first embodiment, wherein the optical fiber exhibits a macrobend loss of less than 0.005 dB/turn when wound upon on a 60 mm diameter mandrel.

A tenth embodiment of the present disclosure may include the first embodiment, wherein $1 \leq r_2/r_1 \leq 9$, $r_1 \leq 8$ µm and $r_2 \leq 20$ µm.

A eleventh embodiment of the present disclosure may include the first embodiment, wherein $2.5 \leq r_2/r_1 \leq 5$.

A twelfth embodiment of the present disclosure may include the first embodiment, wherein the optical fiber exhibits a zero dispersion wavelength $\lambda_0$, and 1300 nm$\leq \lambda_0 \leq$1324 nm.

A thirteenth embodiment of the present disclosure may include the first embodiment, wherein the optical fiber exhibits a microbend loss of less than or equal to 1 db/km.

A fourteenth embodiment of the present disclosure includes a single mode optical fiber, comprising a first core region having an α value $1.5 \leq \alpha \leq 10$, and extending to an outer radius $r_1$, wherein 2.5 µm$\leq r_1 \leq$8 µm, and having a relative refractive index percent profile, $\Delta_1(r)$ in % measured relative to pure silica, a minimum relative refractive index $\Delta_{1MIN}$, a maximum relative refractive index $\Delta_{1MAX}$ and the relative refractive index measured at a radius r=2 µm, wherein $-0.3 \leq \Delta_{1MIN} \leq -0.05$; a second core region surrounding and directly adjacent to the first core region and extending to a radius 10 µm$\leq r_2 \leq$22 µm and having a negative relative refractive index percent profile, $\Delta_2(r)$ in %, measured relative to pure silica, with a minimum relative refractive index percent $\Delta_{2MIN}$, wherein $-0.47\% \leq \Delta_{2MIN} \leq -0.3\%$ and wherein a volume V of the second annular core region is less than or equal to 14% $\Delta$µm$^2$; a cladding region surrounding the core and comprising a relative refractive index percent $\Delta_3(r)$ in % measured relative to pure silica and a minimum refractive index delta $\Delta_{3MIN}$, and $-0.55\% \leq \Delta_3 \leq -0.3\%$; and wherein the optical fiber has a cable cutoff of less than 1530 nm, a mode field diameter at 1310 nm of 8.6 microns to 9.7 microns, a mode field diameter at 1550 nm of 9.9 microns to 11 microns and an attenuation at 1550 nm of less than or equal to 0.17 dB/km.

A fifteenth embodiment of the present disclosure may include the fourteenth embodiment, wherein the volume V of the second annular core region is 0% $\Delta$µm$^2$ to 9% $\Delta$µm$^2$.

A sixteenth embodiment of the present disclosure may include the fourteenth embodiment, wherein the volume V of the second annular core region is 4% $\Delta$µm$^2$ to 9% $\Delta$µm$^2$.

A seventeenth embodiment of the present disclosure may include the fourteenth embodiment, wherein the volume V of the second annular core region is 2% $\Delta$µm$^2$ to 7% $\Delta$µm$^2$.

A eighteenth embodiment of the present disclosure may include the fourteenth embodiment, wherein the volume V of the second annular core region is 2% $\Delta\mu m^2$ to 9% $\Delta\mu m^2$.

A nineteenth embodiment of the present disclosure may include the fourteenth embodiment, wherein the optical fiber exhibits a bend loss of less than 0.005 dB/turn when wound upon on a 60 mm diameter mandrel.

A twentieth embodiment of the present disclosure may include the fourteenth embodiment, wherein the optical fiber exhibits a macrobend loss of less than 0.75 dB/turn when wound upon on a 30 mm diameter mandrel.

A twenty-first embodiment of the present disclosure may include the fourteenth embodiment, wherein the optical fiber exhibits a macrobend loss of less than 0.5 dB/turn when wound upon on a 40 mm diameter mandrel.

A twenty-second embodiment of the present disclosure may include the fourteenth embodiment, wherein the optical fiber exhibits a macrobend loss of less than 0.05 dB/turn when wound upon on a 50 mm diameter mandrel.

A twenty-third embodiment of the present disclosure may include the fourteenth embodiment, wherein $1 \leq r_2/r_1 \leq 9$, $r_1 \leq 8$ μm and $r_2 \leq 20$ μm.

A twenty-fourth embodiment of the present disclosure may include the fourteenth embodiment, wherein $2.5 \leq r_2/r_1 \leq 5$.

A twenty-fifth embodiment of the present disclosure may include the fourteenth embodiment, wherein the optical fiber exhibits a zero dispersion wavelength $\lambda_0$, and 1300 nm $\leq \lambda_0 \leq$ 1324 nm.

A twenty-sixth embodiment of the present disclosure may include the fourteenth embodiment, wherein the optical fiber exhibits a microbend loss of less than or equal to 1 db/km.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification, and in the claims, which follow, reference will be made to a number of terms which shall be defined to have the following meanings:

"Radial position" or the radial coordinate "r" refers to radial position relative to the centerline (r=0) of the fiber. The length dimension "micron" may be referred to herein as micron (or microns) or μm. Areal dimensions based on microns may be referred to herein as micron$^2$ or μm$^2$.

The "refractive index profile" is the relationship between refractive index or relative refractive index and waveguide fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" is defined as:

$$\Delta\% = 100\frac{n^2(r) - n_o^2}{2n^2(r)}$$

where n(r) refractive index at the radial distance r from the fiber's centerline, unless otherwise specified, and $n_c$ is the refractive index of silica at a wavelength of 1550 nm. As used herein, the relative refractive index is represented by $\Delta$ and its values are given in units of "%", unless otherwise specified. In cases where the refractive index of a region is less than that of silica, the relative index percent is negative and is referred to as having a depressed index, and is calculated at the point at which the relative index is most negative unless otherwise specified. In cases where the refractive index of a region is greater than the refractive index of silica, the relative index percent is positive and the region can be said to be raised or to have a positive index, and is calculated at the point at which the relative index is most positive, unless otherwise specified. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index. In one embodiment, the undoped glass is pure silica glass. When the undoped glass is pure silica glass, updopants include Cl, Br, Ge, Al, P, Ti, Zr, Nb, and Ta, and downdopants include F and B.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion values in a two-moded regime assume intermodal dispersion is zero. The zero dispersion wavelength ($\lambda_0$) is the wavelength at which the dispersion has a value of zero. Dispersion slope is the rate of change of dispersion with respect to wavelength.

"Effective area" is defined as:

$$A_{eff} = \frac{2\pi \left[\int_0^\infty (f(r))^2 r dr\right]^2}{\int_0^\infty (f(r))^4 r dr}$$

where f(r) is the transverse component of the electric field of the guided optical signal and r is radial position in the fiber. As used herein, "effective area" or "$A_{eff}$" refers to optical effective area at a wavelength of 1550 nm unless otherwise noted.

The term "α-profile" (also referred to as an "alpha profile") refers to a relative refractive index profile, expressed in terms of Δ(r) which is in units of "%", where r is the radius, which follows the equation:

$$\Delta(r) = \Delta(r_0)\left[1 - \left[\frac{|r - r_0|}{(r_1 - r_0)}\right]^\alpha\right]$$

where $r_0$ is the point at which Δ(r) is maximum, $r_1$ is the point at which Δ(r) is zero, and r is in the range $r_i \le r \le r_f$, where $r_i$ is the initial point of the α-profile, $r_f$ is the final point of the α-profile, and α is a real number.

The mode field diameter (MFD) of an optical fiber is defined as $$MFD = 2w$$

$$w^2 = 2 \frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal and is understood herein to refer to a wavelength of 1550 nm unless otherwise noted. The formula listed herein for MFD is effective for wavelengths of 1310 nm and 1550 nm.

"Trench volume" is defined as:

$$V_{Trench} = |2\int_{r_{Trench,inner}}^{r_{Trench,outer}} \Delta_{Trench}(r) r dr|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % Δmicron$^2$, % Δ-micron$^2$, % Δ-μm$^2$, or % Δμm$^2$, whereby these units can be used interchangeably herein.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load wire mesh (LLWM) attenuation of the waveguide.

Another type of bend test measures fiber attenuation due to macrobending. More specifically, the bend resistance of a waveguide fiber can be gauged by induced attenuation under prescribed test conditions, for example by deploying or wrapping the fiber around a mandrel of a prescribed diameter, e.g., by wrapping 1 turn around a either a 10 mm, 20 mm or 30 mm or similar diameter mandrel (e.g. "1×10 mm diameter macrobend loss" or the "1×20 mm diameter macrobend loss") and measuring the increase in attenuation per turn.

The "pin array" bend test is used to compare relative resistance of waveguide fiber to macrobending losses. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set often cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding.

The effective fiber cutoff is lower than the theoretical cutoff due to losses that are induced by bending and/or mechanical pressure. In this context, the cutoff refers to the higher of the LP11 and LP02 modes, LP11 and LP02 are generally not distinguished in measurements, but both are evident as steps in the spectral measurement (when using the multimode reference technique), i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cable cutoff" is typically lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cable cutoff measurement is described in EIA-455-170 Cable Cutoff Wavelength of Single-mode Fiber by Transmitted Power, or "FOTP-170" Unless otherwise noted herein, optical properties (such as dispersion, dispersion slope, etc.) are reported for the LP01 mode.

The bend resistance of an optical fiber may be gauged by bend-induced attenuation under prescribed test conditions. In the present description, bend losses were determined by a mandrel wrap test. In the mandrel wrap test, the fiber is wrapped around a mandrel having a specified diameter and the attenuation of the fiber in the wrapped configuration at 1550 nm is determined. The bend loss is reported as the increase in attenuation of the fiber in the wrapped configuration relative to the attenuation of the fiber in an unwrapped (straight) configuration. Bend loss is reported herein in units of dB/turn, where one turn corresponds to a single winding of the fiber about the circumference of the mandrel.

The ratio of MFD at 1550 mu to Cable Cutoff wavelength (MFD at 1550 nm/Cable Cutoff wavelength in microns) is defined herein as MACC.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Figure 1:
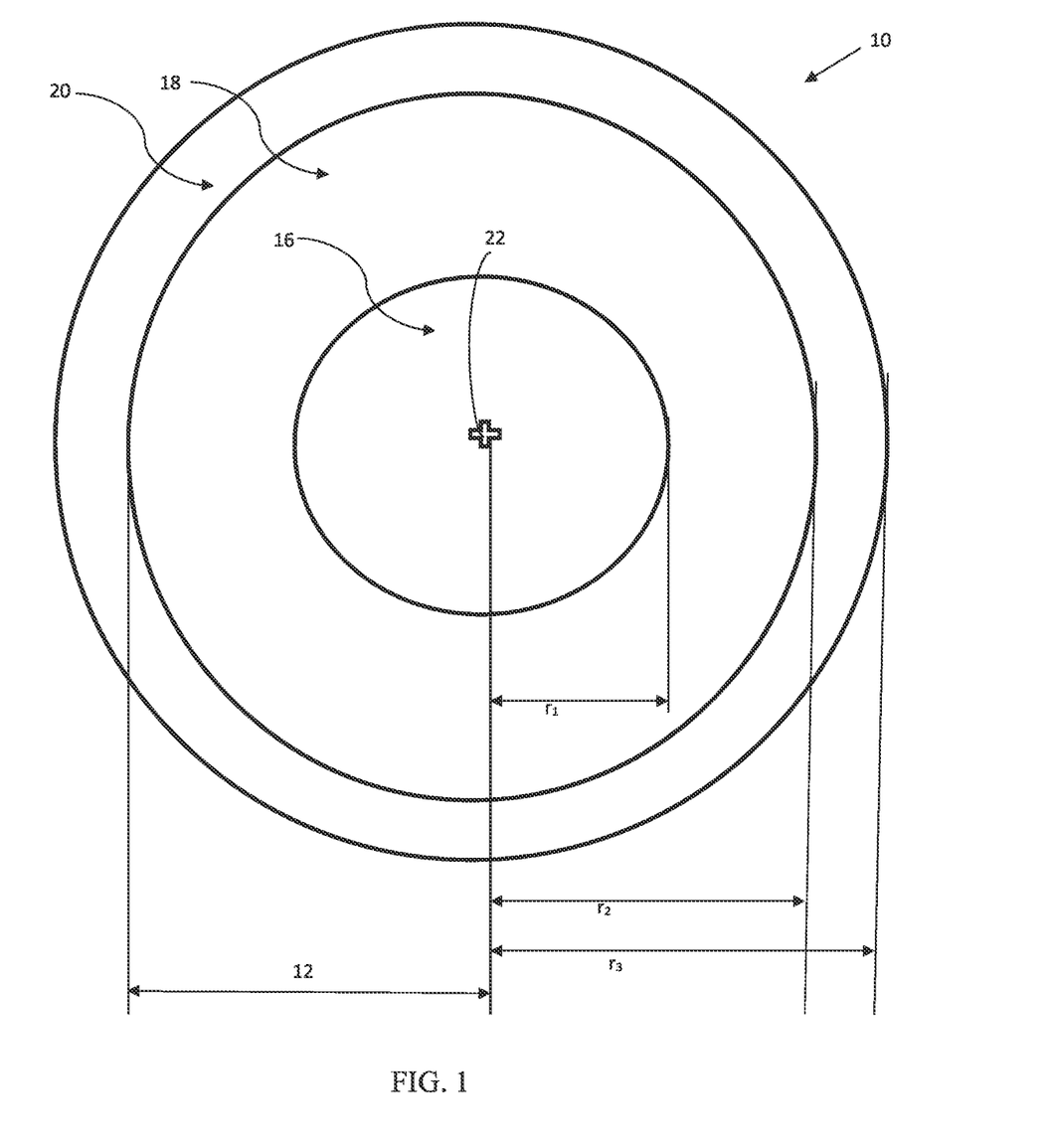
FIG. 1 is a schematic view of an optical fiber in accordance with some embodiments of the current disclosure.

FIG. 1 depicts a cross-sectional view of one embodiment of the optical fiber of the present invention, and is designated generally throughout by the reference numeral 10. The optical fiber 10 includes a central fiber axis 22 (the centerline of the optical fiber 10, which defines radial position R=0) The waveguide fiber 10 includes a core 12 having an effective area ($A_{eff}$) of greater than 70 μm² at a 1550 nm wavelength (for example, 70 μm² to 110 μm², or 75 μm² to 104 μm², or 75 μm² to 97 μm² at a 1550 nm wavelength), and α value 1.5≤α≤10. The waveguide fiber 10 includes a cladding 20 surrounding the core. In some embodiments, intervening layers or regions may be present between the core and cladding. The refractive index profile of the core region may be designed to minimize attenuation losses.

As will be described further hereinbelow, the relative refractive indices of the core region, and cladding region may differ. Each of the regions may be formed from silica glass or a silica-based glass. A silica-based glass is silica glass doped or modified with one or more elements. Variations in refractive index may be accomplished by incorporating updopants or downdopants at levels known to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index may be formed through non-uniform spatial distributions of dopants It is understood that the core forms the central portion of the fiber and is substantially cylindrical in shape. It is further understood that the cladding region is substantially annular in shape. Annular regions may be characterized in terms of an inner radius and an outer radius. Radial positions $r_1$, and $r_2$ refer herein to the outermost radii of the first core region, and second core region, respectively. When two regions are directly adjacent to each other, the outer radius of the inner of the two regions coincides with the inner radius of the outer of the two regions. In one embodiment, for example, the fiber includes a first core region. In such an embodiment, the radius $r_1$ corresponds to the outer radius of the first core region.

Figure 2:
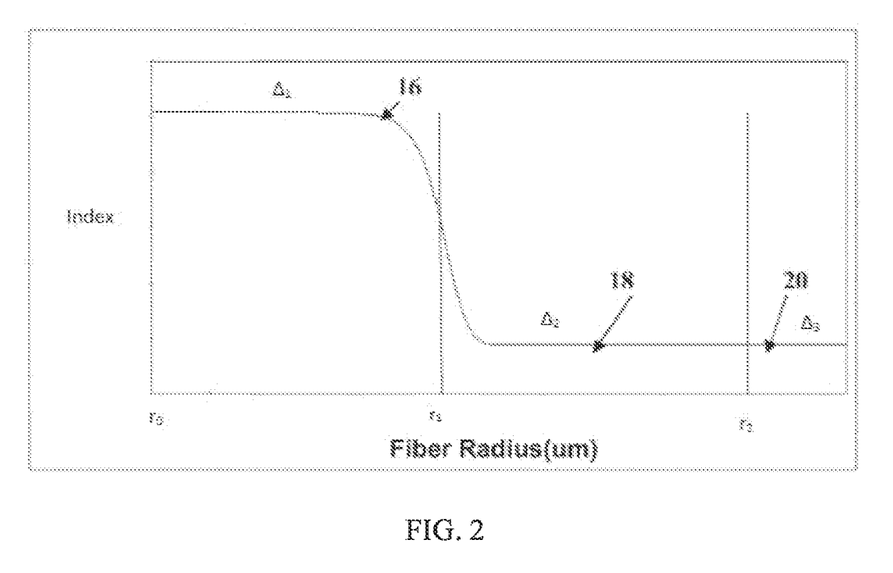
FIG. 2 illustrates schematically an exemplary refractive index profile of the fiber of FIG. 1 in accordance with some embodiments of the current disclosure.

An exemplary refractive index profile (relative refractive index delta, vs. radius) of this fiber is shown schematically in FIG. 2. FIG. 2 shows a relative refractive index profile for a fiber having a first core region 16 extending from radial position $r_0$ to radial position $r_1$ and having relative refractive index $\Delta_1$, and a second core region 18 extending from radial position $r_1$ to radial position $r_2$ and having relative refractive index $\Delta_2$. The first core region 16 has the highest relative refractive index in the profile.

In the embodiment shown in FIG. 2, the core 12 comprises a first core region 16 and a second core region 18 surrounding and directly adjacent to the first core region 16. As used herein, "directly adjacent" means in direct physical contact with, where direct physical contact refers to a touching relationship.

In some embodiments, the core 12 is Ge free.

The first core region 16 has an α value $1.5 \leq \alpha \leq 10$ (for example $2 \leq \alpha \leq 8$, or $1.5 \leq \alpha \leq 6$, $1.5 \leq \alpha \leq 4.5$, or $2 \leq \alpha \leq 4$, or $2 \leq \alpha \leq 3.5$), and extends to an outer radius $r_1$, wherein 2.5 µm$\leq r_1 \leq$8 µm, preferably 3 µm$\leq r_1 \leq$7 µm, more preferably 3.5 µm$\leq r_1 \leq$6 µm. The first core region 16 also has a relative refractive index percent profile, $\Delta_1(r)$ in % measured relative to pure silica, a minimum relative refractive index, $\Delta_{1MIN}$, and a maximum relative refractive index $\Delta_{1MAX}$, and the relative refractive index $\Delta_1$ measured at a radius r=2 µm is: (a) $-0.15 \leq \Delta_1(r=2\ \mu m) \leq 0.1$. In some embodiments $-0.08 \leq \Delta_1(r=2\ \mu m) \leq 0.1$, or $-0.15\% \leq \Delta_1(r=2\ \mu m) \leq 0.05$. In some embodiments $\Delta_{1MAX} = \Delta_1(r=2\ \mu m)$. In some embodiments $-0.35\% \leq \Delta_{1MIN} \leq -0.05\%$, for example $-0.3\% \leq \Delta_{1MIN} \leq -0.1\%$, or $-0.35\% \leq \Delta_{1MIN} \leq -0.1\%$.

In some embodiments, the second core region 18 is fluorine doped. The second core region 18 surrounds and is directly adjacent to the first core region 16. Typically, according to the embodiments described herein, the second core region 18 has 0.6 to 2.5 wt. % fluorine, e.g., 0.6 to 2 wt. %, or 0.9% to 2 wt. %.

The second core region 18 extends to a radius $r_2$, 10 µm$\leq r_2 \leq$22 µm (for example, 11 µm$\leq r_2 \leq$20 µm or 12 µm$\leq r_2 \leq$18 µm) and has a negative relative refractive index percent profile, $\Delta_2(r)$ in %, measured relative to pure silica. The relative refractive index $\Delta_2$ may also be less than or equal to the relative refractive index $\Delta_1$ of the first core region 16 such that the second core region 18 forms a trench in the relative refractive index profile of the core 12. The term "trench," as used herein, refers to a region of the core 12 that is, in radial cross section, surrounded by the first core region 16 the cladding 20. The clad index is set at 20 microns as a reference point and trench volume calculation is based on a 20 micron clad index reference point. In some embodiments, the trench volume V of the second core region 18 is less than or equal to 14% $\Delta\mu m^2$. In some embodiments, the trench volume V of the second core region 18 is 0% $\Delta\mu m^2$ to 8% $\Delta\mu m^2$. In some embodiments, the trench volume V of the second core region 18 is 4% $\Delta\mu m^2$ to 8% $\Delta\mu m^2$. In some embodiments, the trench volume V of the second core region 18 is 4% $\Delta\mu m^2$ to 6% $\Delta\mu m^2$.

The minimum relative refractive index percent $\Delta_{2MIN}$ is: (a) $\Delta_{2MIN} \leq \Delta_1(r=2\ \mu m)$ and $\Delta_{2MIN} \leq \Delta_{1MIN}$. In some preferred embodiments $-0.47\% \leq \Delta_{2MIN} \leq -0.3\%$, and in other preferred embodiments $-0.46\% \leq \Delta_{2MIN} \leq -0.36\%$. For example, $\Delta_{2MIN}$ may be $-0.29\%$, $-0.3\%$, $-0.35\%$, $-0.35\%$, $-0.4\%$, $-0.42\%$, $-0.47\%$ or any number there between. It is noted that in at least some embodiments: $-0.35\% \leq \Delta_2(r=r_1) \leq -0.05\%$.

It is noted that in cases where second core region 18 has a relatively flat refractive index profile, $\Delta_{2MAX} - \Delta_{2MIN}$, $\leq 0.03\%$, the radius $r_2$ is defined to correspond to the beginning of the cladding 20. In some exemplary the second core region 18 reaches $\Delta_{2MIN}$ value at the radius $r_2$, just before the beginning of the cladding 20.

In some embodiments the ratio $r_2/r_1$ is $1 \leq r_2/r_1 \leq 9$. Preferably $r_1 \leq 8$ µm and $r_2 \leq 20$ µm. In some embodiments the ratio $2.5 \leq r_2/r_1 \leq 5$ (or $0.2 \leq r_1/r_2 \leq 0.4$).

The cladding 20 surrounds the core 12 and has a relative refractive index percent, $\Delta_3(r)$ in %, measured relative to pure silica, and $\Delta_3(r) \geq \Delta_{2MIN}$ where the cutoff is less than or equal to 1260 nm. In some embodiments, $\Delta_3(r)$ is less than or equal to $\Delta_2$ where the cutoff is less than or equal to 1530 nm. In some exemplary embodiments $\Delta_3(r) \geq \Delta_{2MIN}$. In some exemplary embodiments $\Delta_3(r) \geq \Delta_{2MAX}$. The cladding 20 preferably has a minimum relative refractive index percent $\Delta_{3MIN}$, wherein $-0.4\% \leq \Delta_{3MIN} \leq -0.2\%$. In some embodiments, $\Delta_{3MIN}$ is less than $-0.4\%$. The cladding 20 extends to a radius $r_3$. In some exemplary embodiments the core 12 and the cladding 20, include F as a downdopant. Preferably, the amount of F in the core regions 16 and 18 increases with the increased radius. Preferably, the F concentration may increase from 0 to 2.0 wt. %, more preferably from 0 to 1.8% wt. %, for example from 0 to 1.6 wt. %.

In some exemplary embodiments the core 12 also includes at least one alkali metal oxide dopant, for example, where in the alkali is K, Na, Li, Cs, and, Rb. In some exemplary embodiments the core 12 contains $K_2O$ in the amounts of 5 ppm to 1000 ppm by weight of K, more preferably between 5-500 ppm wt. of K, and most preferably between 5-300 ppm wt. of K. Fiber 10 may also include chlorine. It is preferable that the amount of chlorine is less than 3500 ppm by wt. in the core 12, and less than 500 ppm by wt. in the cladding 20. In some embodiments, the fiber comprises a Cl doped core wherein the range of Cl in the first core region 16 is 1500-10000 ppm or 1500-3500 ppm. As the Cl doped core will raise the refractive index based on the amount of Cl doping, the surrounding sections of the fiber will be adjusted accordingly with respect to the core. It is noted that the term "ppm", unless otherwise specially noted otherwise, refers to parts per million by weight, or ppm by weight, and a measurement on wt. can be converted to ppm by multiplying by a factor of 10,000.

The relative refractive index profile of the optical fiber 10 is selected to provide attenuation of no more than 0.17 dB/km at the wavelength λ of 1550 nm, for example 0.145 dB/km to 0.17 dB/km at the wavelength λ of 1550 nm, more preferably from 0.145 to 0.165 dB/km, most preferably from 0.145 to 0.160 dB/km. The attenuation values can be 0.15 dB/km to 0.17 dB/km, or 0.145 dB/km to 0.165 dB/km, or, for example: 0.149 dB/km; 0.15 dB/km, 0.152 dB/km; 0.153 dB/km; 0.155 dB/km, 0.158 dB/km, 0.16 dB/km, 0.162 dB/km; 0.165 dB/km, 0.168 dB/km, or 0.17 dB/km at the wavelength λ of 1550 nm.

In at least some embodiments the fibers have a zero dispersion wavelength $\lambda_0$ of 1300 nm$\leq \lambda_0 \leq$1324 nm. in at least some embodiments the fibers have a MFD at 1310 nm of 8.6 microns to 9.7 microns. In at least some embodiments the fibers have a MFD at 1550 nm of 9.9 microns to 11 microns. In at least some embodiments the fibers have a cable cutoff of less than 1530 nm. In at least some embodiments the fibers have a cable cutoff of less than 1260 nm.

In some embodiments, macrobend loss at 1550 nm is less than 0.75 dB/km when wound upon on a 30 mm diameter mandrel. In some embodiments, macrobend loss at 1550 nm is less than 0.5 dB/turn when wound upon on a 40 mm diameter mandrel. In some embodiments, macrobend loss at 1550 nm is less than 0.05 dB/turn when wound upon on a 50 mm diameter mandrel. In some embodiments, macrobend loss at 1550 nm is less than 0.005 dB/turn when wound upon on a 60 mm diameter mandrel.

Figure 3:
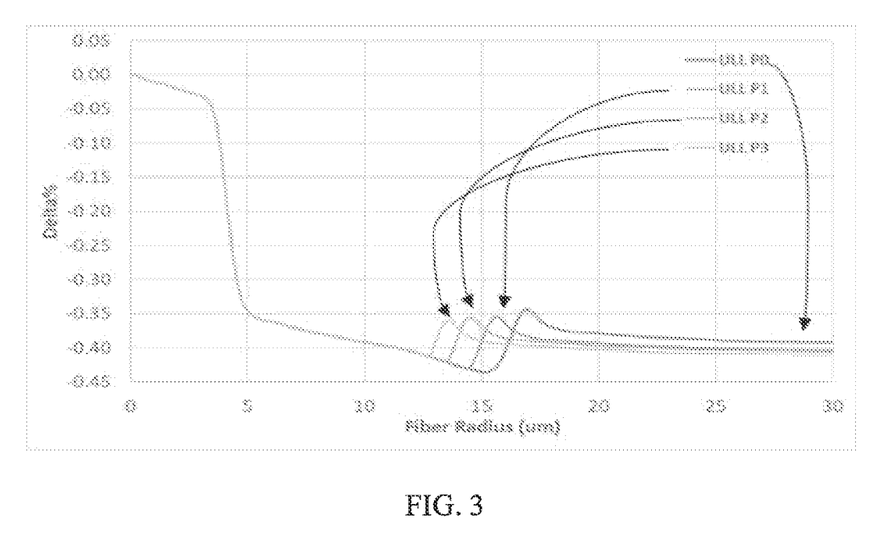
FIG. 3 depicts a relative refractive index profile of a single-mode optical fiber in accordance with some embodiments of the current disclosure.

FIG. 3 depicts a relative refractive index profile of three exemplary single-mode optical fiber in accordance with some embodiments of the current disclosure. Fiber ULLP0 depicts a relative refractive index profile of a comparative example fiber having a modelled trench volume of 14.5% $\Delta\mu m^2$. Fiber ULLP1 depicts a relative refractive index profile of a fiber in accordance with the current disclosure having a modelled trench volume of 8.75% $\Delta\mu m^2$. Fiber ULLP2 depicts a relative refractive index profile of a fiber in accordance with the current disclosure having a modelled trench volume of 6.36% $\Delta\mu m^2$. Fiber ULLP3 depicts a relative refractive index profile of a fiber in accordance with the current disclosure having a modelled trench volume of 4.16% $\Delta\mu m^2$. In the profiles of fiber ULLP1, ULLP2, and ULLP3 the reduced trench volume is achieved by reducing the second interface location as compared to the comparative profile of fiber ULLP0. Table 1, Table 2 and Table 3 lists optical characteristics of Exemplary Fibers 1-12 having a trench volume of less than or equal to 14% $\Delta\mu m^2$.

TABLE 1

| Fiber Example | MFD at 1310 nm | MFD at 1550 nm | Cable Cutoff | Zero dispersion wavelength $\lambda_0$ | MACC at 1310 nm | MACC at 1550 nm |
|---|---|---|---|---|---|---|
| EX1 | 9.287 | 10.621 | 1151 | 1311.85 | 8.07 | 9.23 |
| EX2 | 9.216 | 10.526 | 1207 | 1308.7 | 7.63 | 8.72 |
| EX3 | 9.169 | 10.485 | 1191 | 1312.81 | 7.7 | 8.81 |
| EX4 | 9.151 | 10.451 | 1124 | 1314.42 | 8.14 | 9.34 |
| EX5 | 9.305 | 10.569 | 1240 | 1307.57 | 7.5 | 8.52 |
| EX6 | 9.299 | 10.526 | 1250 | 1307.15 | 7.44 | 8.42 |
| EX7 | 9.169 | 10.460 | 1260 | 1309.44 | 7.76 | 8.32 |
| EX8 | 9.182 | 10.483 | 1243 | 1309.22 | 8.09 | 8.45 |
| EX9 | 9.128 | 10.447 | 1249 | 1314.83 | 7.9 | 8.57 |
| EX10 | 9.318 | 10.683 | 1050 | 1313.58 | 8.87 | 10.08 |
| EX11 | 9.172 | 10.490 | 1200 | 1311.08 | 8.34 | 8.75 |
| EX12 | 9.728 | 10.984 | 1235 | 1302.68 | 8.75 | 9.04 |

TABLE 2

| Fiber Example | 20 mm dB/turn (Modelled) | 30 mm dB/turn (Modelled) | 32 mm dB/turn (Modelled) | 40 mm dB/turn (Modelled) | 50 mm dB/turn (Modelled) | 60 mm dB/turn (Modelled) |
|---|---|---|---|---|---|---|
| EX1 | 1.443 | 0.133496 | 0.008677 | 0.000404 | 0.00028 | 0.000121 |
| EX2 | 0.55084 | 0.003503 | 0.001899 | 0.000268 | 0.00018 | 0.000107 |
| EX3 | 0.579787 | 0.006849 | 0.002682 | 0.000489 | 0.0003 | 0.000037 |
| EX4 | 2.319905 | 0.156504 | 0.023059 | 0.000621 | 0.00029 | 0.000038 |
| EX5 | 0.481758 | 0.007454 | 0.000544 | 0.00022 | 0.00011 | 0.000012 |
| EX6 | 0.480286 | 0.007186 | 0.00071 | 0.000121 | 0.00006 | 0.000008 |
| EX7 | 0.49870768 | 0.00448327 | 0.00013357 | 0.00007 | 0.00001409 | 0.000001 |
| EX8 | 0.31046749 | 0.00459386 | 0.01465032 | 0.00045295 | 0.00000978 | 0.000013 |
| EX9 | 0.82012573 | 0.00790599 | 0.00001775 | 0.00003723 | 0.000307 | 0.00000005 |
| EX10 | 3.44 | 0.70340898 | 2.4068641 | 0.49813355 | 0.0415996 | 0.00014651 |
| EX11 | 0.50104938 | 0.00879968 | 0.02348502 | 0.00101279 | 0.00005 | 0.00001942 |
| EX12 | 0.60458467 | 0.01317438 | 0.01759408 | 0.00050715 | 0.00026 | 0.00000675 |

TABLE 3

| Fiber Example | Microbend 1550 nm (dB/km) (Modelled) | Macrobend 20 mm 1550 (dB/t) (Measured) | Macrobend 30 mm 1550 (dB/t) (Measured) | Trench Volume (Measured) |
|---|---|---|---|---|
| EX1 | 0.437 | NA | NA | 11.78 |
| EX2 | 0.41 | NA | NA | 5.49 |
| EX3 | 0.514 | NA | NA | 3.48 |
| EX4 | 0.612 | NA | NA | 6.24 |
| EX5 | 0.44 | NA | NA | 2.11 |
| EX6 | 0.439 | NA | NA | 1.93 |
| EX7 | 0.38 | 0.506 | 0.005 | 1.38 |
| EX8 | 0.449 | 0.604 | 0.01 | 2.62 |
| EX9 | 0.531 | 0.775 | 0.01 | 3 |
| EX10 | 1.059 | NA | NA | 10.05 |
| EX11 | 0.509 | 0.548 | 0.016 | 4.34 |
| EX12 | 0.752 | 0.62 | 0.009 | 3.33 |

The core and cladding of the present fibers may be produced in a single-step operation or multi-step operation by methods which are well known in the art. Suitable methods include: the flame combustion methods, flame oxidation methods, flame hydrolysis methods, OVD (outside vapor deposition), IVD (inside vapor deposition), VAD (vapor axial deposition), double crucible method, rod-in-tube procedures, cane-in-soot method, and doped deposited silica processes. A variety of CVD processes are known and are suitable for producing the core regions and cladding region used in the optical fibers of the present invention. They include external CVD processes, axial vapor deposition processes, modified CVD (MCVD), inside vapor deposition, and plasma-enhanced CVD (PECVD).

Suitable precursors for silica include $SiCl_4$ and organosilicon compounds. Organosilicon compounds are silicon compounds that include carbon. Organosilicon compounds may also include oxygen and/or hydrogen. Examples of organosilicon compounds include OMCTS (octamethylcyclotetrasiloxane), silicon alkoxides ($Si(OR)_4$), organosilanes ($SiR_4$), and $Si(OR)_xR_{4-x}$, where R is a carbon-containing organic group or hydrogen and where R may be the same or different at each occurrence, subject to the proviso that at least one R is a carbon-containing organic group. Suitable precursors for chlorine doping include $Cl_2$, $SiCl_4$, $Si_2Cl_6$, $Si_2OCl_6$, $SiCl_3H$, and $CCl_4$. Suitable precursors for fluorine doping include $F_2$, $CF_4$, and $SiF_4$.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A single mode optical fiber, comprising:
a first core region having an α value $1.5 \leq \alpha \leq 10$, and extending to an outer radius $r_1$, wherein 2.5 μm≤$r_1$≤8 μm, and having a relative refractive index percent profile, $\Delta_1(r)$ in % measured relative to pure silica, a minimum relative refractive index $\Delta_{1MIN}$, a maximum relative refractive index $\Delta_{1MAX}$, and the relative refractive index $\Delta_1$ measured at a radius r=2 μm, wherein $-0.35 \leq \Delta_{1MIN} \leq -0.05$, and wherein $-0.15 \leq \Delta_1(r=2 \mu m) \leq 0.1$;
a second core region surrounding and directly adjacent to the first core region and extending to a radius 10 μm≤$r_2$≤22 μm and having a negative relative refractive index percent profile, $\Delta_2(r)$ in %, measured relative to pure silica, with a minimum relative refractive index percent $\Delta_{2MIN}$, wherein $-0.47\% \leq \Delta_{2MIN} \leq -0.3\%$ and wherein a volume V of the second core region is less than or equal to 14% $\Delta\mu m^2$;

a cladding region surrounding the core and comprising: a relative refractive index percent $\Delta_3(r)$ in % measured relative to pure silica and a minimum refractive index delta $\Delta_{3MIN}$, and $-0.45\% \leq \Delta_3 \leq -0.2\%$; and wherein the optical fiber has a cable cutoff of less than 1260 nm, a mode field diameter at 1310 nm of 8.6 microns to 9.7 microns, a mode field diameter at 1550 nm of 9.9 microns to 11 microns, and an attenuation at 1550 nm of less than or equal to 0.17 dB/km.

2. The optical fiber of claim 1, wherein the volume V of the second annular core region is 0% $\Delta\mu m^2$ to 9% $\Delta\mu m^2$.

3. The optical fiber of claim 1, wherein the volume V of the second annular core region is 4% $\Delta\mu m^2$ to 9% $\Delta\mu m^2$.

4. The optical fiber of claim 1, wherein the volume V of the second annular core region is 2% $\Delta\mu m^2$ to 7% $\Delta\mu m^2$.

5. The optical fiber of claim 1, wherein the volume V of the second annular core region is 2% $\Delta\mu m^2$ to 9% $\Delta\mu m^2$.

6. The optical fiber of claim 1, wherein the optical fiber exhibits a macrobend loss of less than 0.75 dB/turn when wound upon on a 30 mm diameter mandrel.

7. The optical fiber of claim 1, wherein the optical fiber exhibits a macrobend loss of less than 0.5 dB/turn when wound upon on a 40 mm diameter mandrel.

8. The optical fiber of claim 1, wherein the optical fiber exhibits a macrobend loss of less than 0.05 dB/turn when wound upon on a 50 mm diameter mandrel.

9. The optical fiber of claim 1, wherein the optical fiber exhibits a macrobend loss of less than 0.005 dB/turn when wound upon on a 60 mm diameter mandrel.

10. The optical fiber of claim 1, wherein $1 \leq r_2/r_1 \leq 9$, $r_1 \leq 8$ μm and $r_2 \leq 20$ μm.

11. The optical fiber of claim 1, wherein $2.5 \leq r_2/r_1 \leq 5$.

12. The optical fiber of claim 1, wherein the optical fiber exhibits a zero dispersion wavelength $\lambda_0$, and 1300 nm $\leq \lambda_0 \leq$ 1324 nm.

13. The optical fiber of claim 1, wherein the optical fiber exhibits a microbend loss of less than or equal to 1 db/km.

14. A single mode optical fiber, comprising:

a first core region having an α value $1.5 \leq \alpha \leq 10$, and extending to an outer radius $r_1$, wherein 2.5 μm $\leq r_1 \leq 8$ μm, and having a relative refractive index percent profile, $\Delta_1(r)$ in % measured relative to pure silica, a minimum relative refractive index $\Delta_{1MIN}$, a maximum relative refractive index $\Delta_{1MAX}$, and the relative refractive index $\Delta_1$ measured at a radius r=2 μm, wherein $-0.3 \leq \Delta_{1MIN} \leq -0.05$, and wherein $-0.15 \leq \Delta_1(r=2$ μm$) \leq 0.1$;

a second core region surrounding and directly adjacent to the first core region and extending to a radius 10 μm $\leq r_2 \leq 22$ μm and having a negative relative refractive index percent profile, $\Delta_2(r)$ in %, measured relative to pure silica, with a minimum relative refractive index percent $\Delta_{2MIN}$, wherein $-0.47\% \leq \Delta_{2MIN} \leq -0.3\%$ and wherein a volume V of the second annular core region is less than or equal to 14% 4 μm$^2$;

a cladding region surrounding the core and comprising a relative refractive index percent $\Delta_3(r)$ in % measured relative to pure silica and a minimum refractive index delta $\Delta_{3MIN}$, and $-0.55\% \leq \Delta_3 \leq -0.3\%$; and wherein the optical fiber has a cable cutoff of less than 1530 nm, a mode field diameter at 1310 nm of 8.6 microns to 9.7 microns, a mode field diameter at 1550 nm of 9.9 microns to 11 microns and an attenuation at 1550 nm of less than or equal to 0.17 dB/km.

15. The optical fiber of claim 14, wherein the volume V of the second annular core region is 0% 4 μm$^2$ to 9% 4 μm$^2$.

16. The optical fiber of claim 14, wherein the volume V of the second annular core region is 4% 4 μm$^2$ to 9% 4 μm$^2$.

17. The optical fiber of claim 14, wherein the optical fiber exhibits a bend loss of less than 0.005 dB/turn when wound upon on a 60 mm diameter mandrel.

18. The optical fiber of claim 14, wherein the optical fiber exhibits a macrobend loss of less than 0.75 dB/turn when wound upon on a 30 mm diameter mandrel.

19. The optical fiber of claim 14, wherein the optical fiber exhibits a macrobend loss of less than 0.5 dB/turn when wound upon on a 40 mm diameter mandrel.

20. The optical fiber of claim 14, wherein $1 \leq r_2/r_1 \leq 9$, $r_1 \leq 8$ μm and $r_2 \leq 20$ μm.

* * * * *

UNITED STATES PATENT AND TRADEMARK OFFICE
CERTIFICATE OF CORRECTION

PATENT NO. : 11,681,098 B2
APPLICATION NO. : 17/547672
DATED : June 20, 2023
INVENTOR(S) : Peter Gottfried Hebgen et al.

It is certified that error appears in the above-identified patent and that said Letters Patent is hereby corrected as shown below:

In the Claims

In Column 14, Line 15 (Approx.), in Claim 14, delete "14% 4" and insert -- 14% $\Delta$ --.

In Column 14, Line 27, in Claim 15, delete "0% 4" and insert -- 0% $\Delta$ --.

In Column 14, Line 27, in Claim 15, delete "9% 4" and insert -- 9% $\Delta$ --.

In Column 14, Line 29, in Claim 16, delete "4% 4" and insert -- 4% $\Delta$ --.

In Column 14, Line 29, in Claim 16, delete "9% 4" and insert -- 9% $\Delta$ --.

Signed and Sealed this
Fifth Day of December, 2023

Katherine Kelly Vidal
*Director of the United States Patent and Trademark Office*